United States Patent [19]

Inoue

[11] Patent Number: 5,724,341
[45] Date of Patent: Mar. 3, 1998

[54] NETWORK CONTROL APPARATUS

[75] Inventor: Yoshitsugi Inoue, Kawasaki, Japan

[73] Assignee: Fujitsu Limited, Kanagawa, Japan

[21] Appl. No.: 574,864

[22] Filed: Dec. 19, 1995

[30] Foreign Application Priority Data

Dec. 27, 1994 [JP] Japan .................. 6-325673

[51] Int. Cl.$^6$ .................. H04B 1/74
[52] U.S. Cl. .................. 370/221; 370/226
[58] Field of Search .................. 371/68.2; 455/8; 340/825.01; 375/260, 285; 370/217, 225, 226, 227, 228, 254, 400, 409

[56] References Cited

U.S. PATENT DOCUMENTS 5,034,945 7/1991 Kimoto et al. .................. 370/227
5,398,236 3/1995 Hemmady et al. .................. 370/225

FOREIGN PATENT DOCUMENTS 4-88738 3/1992 Japan .
5-122219 5/1993 Japan .

*Primary Examiner*—Benedict V. Safourek
*Attorney, Agent, or Firm*—Helfgott & Karas, P.C.

[57] ABSTRACT

For the purpose of controlling a communication network used for communication of information and having a plurality of transmission units and a plurality of circuits making connections between the plurality of transmission units, a network control apparatus is provided which rearranges the communication network, by using a plurality of transmission units and a plurality of circuits, into at least one terminal network of at least four terminals. This network control apparatus has a faulty section detecting unit which detects a faulty section which includes a circuit in which a failure has occurred, based on failure information with regard to failures which can occur in each terminal network; a pattern storage unit in which are pre-stored patterns, for each terminal network, with regard to the circuit paths which could be taken in each terminal network; a pattern selection unit which, when a faulty section is detected, selects from the pattern storage unit a pattern corresponding to an alternative route which avoids the faulty section; and a transmission unit control unit which controls the operation of each of the transmission units in accordance with a circuit path which includes the selected pattern.

4 Claims, 14 Drawing Sheets

Fig.9(A)

| FAILURE INFORMATION IN EACH CIRCUIT | STATION A | | | STATION B | | | STATION C | | | STATION D | | | REMARKS |
|---|---|---|---|---|---|---|---|---|---|---|---|---|---|
| PATTERNS SELECTED AS A RESULT OF DETERMINATION | (a) | (b) | (c) | (a) | (d) | (e) | (f) | (c) | (e) | (b) | (d) | (f) | |
| PATTERNS DURING NORMAL OPERATION | ☆ | | | | | | | | | | | | RECOVERY FROM FAILURE |
| SELECTION OF ALTERNATIVE PATTERNS OF (a) | | | ☆ | | | | | | | | | | FAILURE AT SINGLE STATION |
| | | ☆ | | ☆ | | | | | | | | | FAILURE BETWEEN OPPOSITE STATIONS |
| SELECTION OF ALTERNATIVE PATTERNS OF (b) | | ☆ | | | | | | | | | | | FAILURE AT SINGLE STATION |
| | ☆ | | | | | | | | | ☆ | | | FAILURE BETWEEN OPPOSITE STATIONS |
| SELECTION OF ALTERNATIVE PATTERNS OF (c) | | | | | | | | ☆ | | | | | FAILURE AT SINGLE STATION |
| | | | ☆ | | | | | | | | | | FAILURE BETWEEN OPPOSITE STATIONS |

Fig.9(B)

| FAILURE INFORMATION IN EACH CIRCUIT / PATTERNS SELECTED AS A RESULT OF DETERMINATION | STATION A | | | STATION B | | | STATION C | | | STATION D | | | REMARKS |
|---|---|---|---|---|---|---|---|---|---|---|---|---|---|
| | (a) | (b) | (c) | (a) | (d) | (e) | (f) | (c) | (e) | (b) | (d) | (f) | |
| SELECTION OF ALTERNATIVE PATTERNS OF (d) | | | | | ☆ | | | | | | ☆ | | FAILURE AT SINGLE STATION |
| | | | | | ☆ | | | | | | ☆ | | FAILURE BETWEEN OPPOSITE STATIONS |
| SELECTION OF ALTERNATIVE PATTERNS OF (e) | | | | | | ☆ | | | ☆ | | | | FAILURE AT SINGLE STATION |
| | | | | | | ☆ | | | ☆ | | | | FAILURE BETWEEN OPPOSITE STATIONS |
| SELECTION OF ALTERNATIVE PATTERNS OF (f) | | | | | | | ☆ | | | | | ☆ | FAILURE AT SINGLE STATION |
| | | | | | | | ☆ | | | | | ☆ | FAILURE BETWEEN OPPOSITE STATIONS |

NETWORK CONTROL APPARATUS

BACKGROUND OF THE INVENTION

1. Field of the Invention

The present invention relates to a network control apparatus for the purpose of controlling at least one network which has a plurality of transmission units, such as stations, and a plurality of circuits between these stations, wherein prescribed transmission line are formed by this plurality of circuits, so as to perform communication of information between different points.

More specifically, the present invention relates to a field concerned with the provision of a transmission unit which is made up of multiple layers of multiplexing or provision of a network made of up transmission lines between such transmission units, or to a field concerned with a field in which a privately operated network is configured and used for business operations. In general, in an information network which includes transmission units configured based on multiple layers of multiplexing, to prevent the cutoff of communication due to a failure in a transmission unit or in one location or region of a transmission line within the network, it is necessary to perform recovery from the above-noted failure by means of spare units, spare apparatuses, and routing the circuit through an alternative route.

2. Description of the Related Art

To handle failures which occur in a transmission unit or in one part of a transmission line, the method used in the past was that of a spare configuration, which includes spare units and apparatuses provided in units of pre-established sections of the network, or that of using alternative routes which were formed by means of three-terminal networks used to form a configuration of the network. In this case, because of the similarity of the network made up of a plurality of stations and a plurality of circuits to the case of an electrical circuit network in which a plurality of terminals are successively connected, the above-noted "three-terminal network" term is used. Examples of using this three-terminal network configuration have been reported in the past and are about to be implemented.

There are cases, such as the case of between Tokyo and Nagoya, in which the network between different points has many stations, and many circuits (for example, between 300,000 and 400,000 circuits) joining these stations. In the past, a method of providing a configuration of alternative routes, by means of spares in units of sections and three-terminal networks, was employed in a configuration of a network between different points in which physical connection was made from one circuit to a number of normal circuits. In this sense, the term "alternative route" means the configuration of a circuit path in a different direction using a separate circuit when it becomes impossible to perform communication in a given direction because of a circuit failure in that direction.

However, at present, networks are intricately interconnected, and the above-noted type of network control, by means of an alternative-route configuration, tends to be difficult. In addition, in current networks, consideration is not given to physically providing the above-noted alternative routes. For that reason, in order to make an alternative route on a given section, for example between station X and station Y, it is necessary to provide a circuit that is equivalent to the circuit between station X and station Y.

Stated differently, although, at present, to avoid the cutoff of communications caused by failure of a transmission unit in a station or a transmission line in a certain network, an approach is made by providing a means of circuit repair by providing a redundancy in the transmission units or alternative transmission line routes, the complexity of networks makes it extremely uneconomical to provide a configuration of total redundancy or alternative routes, and to perform alternative route control which is suited to the manner in which the network is used.

SUMMARY OF THE INVENTION

In consideration of the above-noted problems, the present invention has as an object the provision of a network control apparatus which enables a shortening of the control time with respect to a fault occurring due to a failure occurring in a complex communication network.

Another object of the present invention is to provide a network which is capable of improving service by minimizing the section affected by a fault occurring due to a failure occurring within the network, and further capable of achieving an economic saving by minimizing the number of spare units and the amount of spare equipment.

To achieve the above-noted objects, the network control apparatus according to the present invention is configured so that when control is performed of a network which is made up of a plurality of transmission units and a plurality of circuits which make connection between this plurality of transmission units, and which performs communication of information between different points in the communications network over prescribed transmission line formed by the plurality of circuits, each of the above-noted plurality of transmission units are treated as terminals within the above-noted communications network, the above-noted communications network being reconstituted by means of the above-noted plurality of transmission units and above-noted plurality of circuits into at least one terminal network of four or more terminals.

In addition, the network control apparatus of the present invention, based on failure information with regard to failures which could occur in each of the above-noted terminal networks, comprises a faulty section detecting means which detects a faulty section which includes a circuit in which a failure has occurred; a pattern storage unit in which are pre-stored patterns, for each terminal network, with regard to the transmission lines which could be taken in each of the above-noted terminal networks, a pattern selection means which, when an above-noted faulty section is detected, selects from the storage means a pattern of the above-noted patterns corresponding to an alternative route which avoids the above-noted faulty section; and a transmission unit control means which controls the operation of each of the above-noted transmission units in accordance with a transmission line which includes the selected pattern, that is, the alternative route pattern.

It is desirable that, in a network control apparatus according to the present invention, each of the above-noted terminal networks within the network be formed, separated into a transmission line which is formed by a physically configured circuit, and a transmission line which is formed from a logically configured circuit.

In addition, it is desirable, in a network control apparatus according to the present invention, that each of the above-noted terminal networks within the above-noted network includes a service circuit network which operates when the above-noted circuit is normal, and a spare circuit network which operates when a fault occurs in part of the above-noted circuit, and that the above-noted transmission unit control means performs switching from the above-noted service circuit network to the above-noted spare circuit network.

In addition, it is desirable, in a network control apparatus according to the present invention, when a faulty section which includes a circuit in which an above-noted failure has occurred is restored, that the above-noted transmission unit control means performs switching from the above-noted spare circuit network to the above-noted service circuit network.

According to a network control apparatus according to the present invention, the configuration of a complex communication network is arranged into a four-terminal network configuration and, based on this four-terminal network configuration, the establishment of patterns for alternative routes and the implementation of a plurality of spare circuits which form a spare circuit network are facilitated, so that it is possible to reduce the amount of time required to perform control of a fault caused, for example, by such a failure in the communication network.

In addition, according to a network control apparatus according to the present invention, because the alternative route control is simplified by means of the pre-establishment of patterns of alternative routes, service is improved by minimizing the section that is affected by the fault. Additionally, by reducing the number of spare circuits as much as possible, it is possible to achieve a cost reduction by minimizing the spare unit and spare equipment hardware.

BRIEF DESCRIPTION OF THE DRAWINGS

The above-noted objects and features of the present invention will be more apparent from the following description of the preferred embodiments, with reference being made to the accompanying drawings, wherein:

FIG. 9 (A) and FIG. 9 (B) are drawings which show the matrix of fault information judgment and alternative pattern selection used in the present invention;

DESCRIPTION OF THE PREFERRED EMBODIMENT

A basic embodiment and preferred embodiments of the present invention will be described in detail below, with reference being made to the accompanying drawings (FIG. 1 through FIG. 13).

Figure 1:
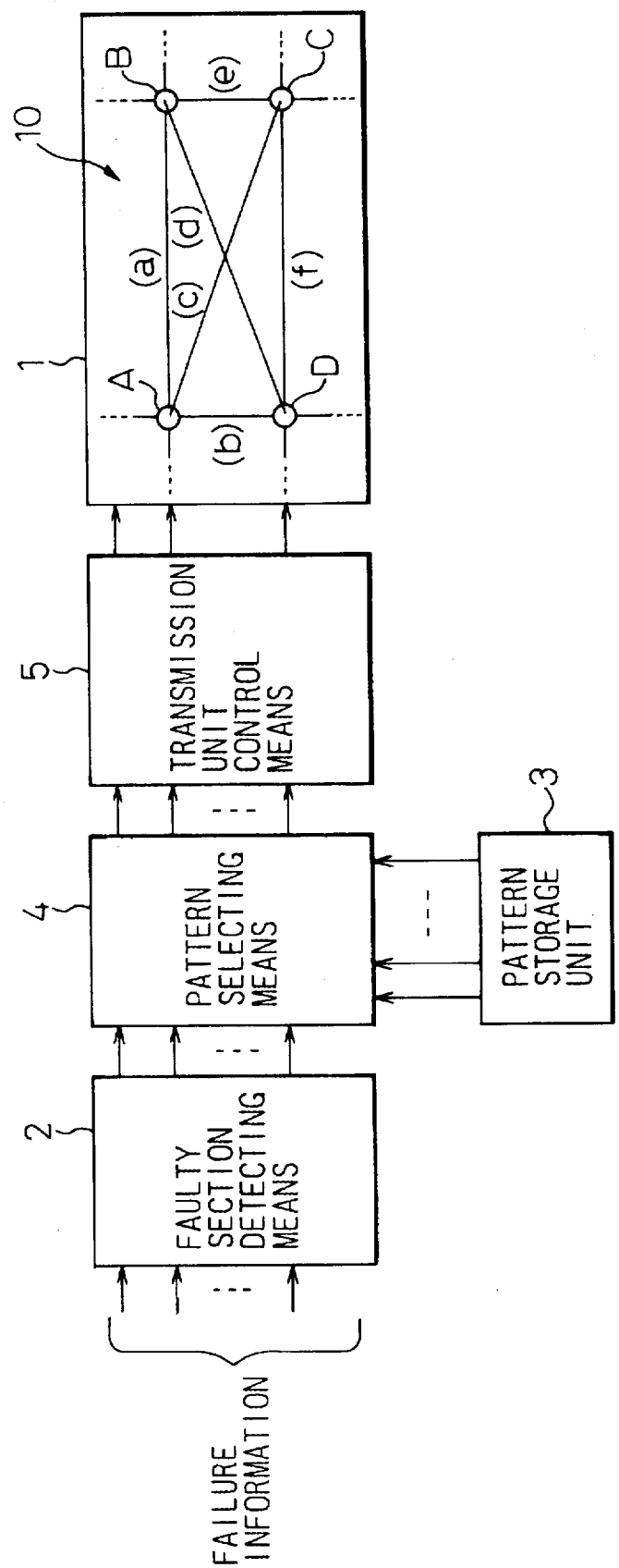
FIG. 1 is a block diagram which shows the configuration of a basic embodiment based on the principle of the present invention.

FIG. 1 is a block diagram which shows the configuration a basic embodiment based on the principle of the present invention. This drawing illustrates a network control apparatus according to the present invention, this apparatus being for the purpose of controlling a network 1 which has a plurality of transmission units and a plurality of circuits which make connection between this plurality of transmission units, and which performs communication of information between different points in the communications network over prescribed transmission line formed by the plurality of circuits.

As shown in FIG. 1, in a network control apparatus according to the present invention, the above-noted network 1 is reconstituted, by the above-noted plurality of transmission units and the above-noted plurality of circuits into terminal networks of at least four terminals. In this case, however, to simplify the description, each of the terminal networks which makes up the network 1 is represented as a four-terminal network 10. In addition, a plurality of transmission units within this four-term network comprise the four stations A, B, C, and D, and the connections between these stations are represented by the plurality of circuits (a), (b), (c), (d), (e), and (f).

In addition, in FIG. 1, the network control apparatus according to the present invention, based on failure information with regard to failures which could occur in each of the above-noted terminal networks, comprises a faulty section detecting means 2, which detects a faulty section which includes a circuit in which a failure has occurred; a pattern storage unit 3, in which are pre-stored patterns, for each terminal network, with regard to the transmission lines which could be taken in each of the above-noted terminal networks; a pattern selection means 4 which, when an above-noted faulty section is detected, selects from the storage means 3 a pattern of the above-noted patterns corresponding to an alternative route which avoids the above-noted faulty section; and a transmission unit control means 5, which controls the operation of each of the above-noted transmission units in accordance with a transmission line which includes the selected pattern, that is, the alternative route pattern.

It is desirable that, in a network control apparatus according to the present invention, each of the above-noted terminal networks within the network 1 be formed separately from a transmission line which is formed by a physically configured circuit, and from a transmission line which is formed from a logically configured circuit.

Figure 2:
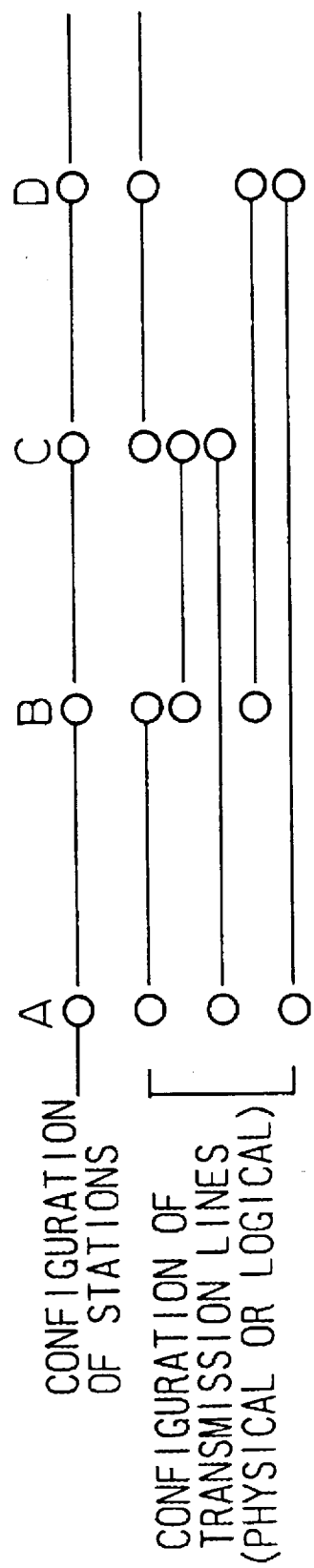
FIG. 2 is a drawing which shows the configuration of a network between a plurality of stations used with the network control apparatus according to a basic embodiment of the present invention.
Figure 3:
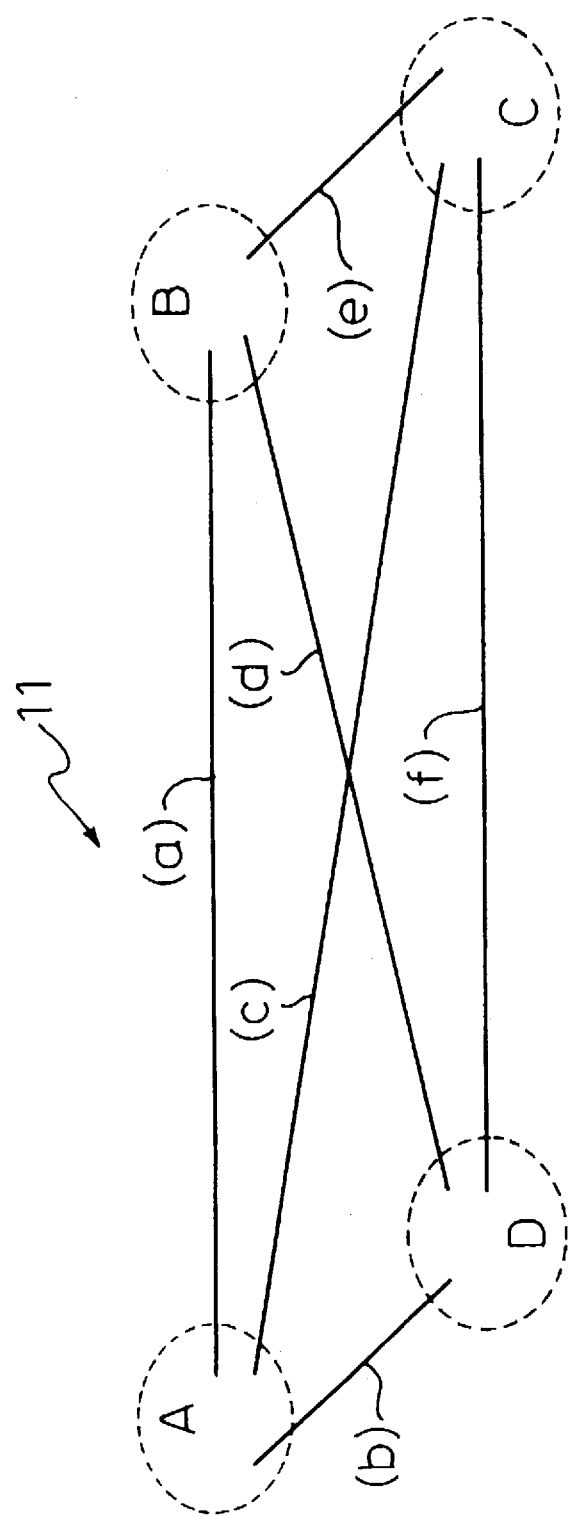
FIG. 3 is a drawing which shows the configuration of a service circuit network within the network used with the network control apparatus according to a basic embodiment of the present invention.
Figure 4:
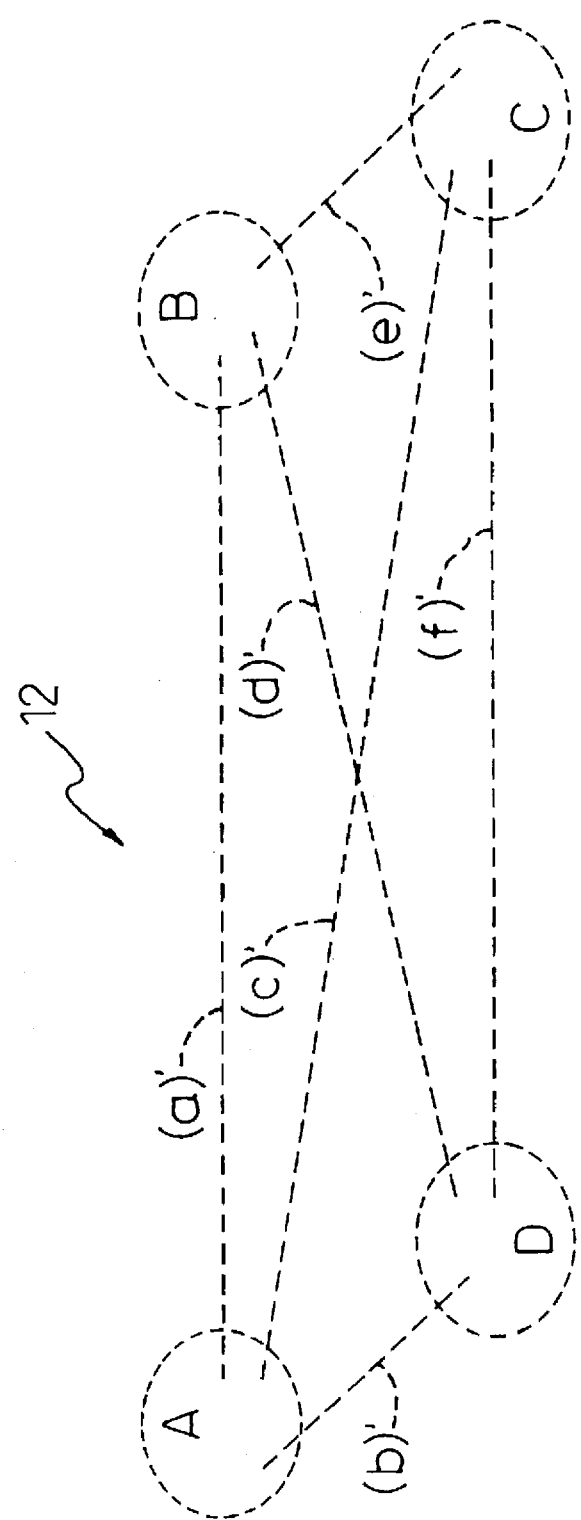
FIG. 4 is a drawing which shows the configuration of spare circuit network within the network used with the network control apparatus according to a basic embodiment of the present invention.

In a network control apparatus according to the present invention, as shown in FIG. 1, the configuration of the network 1 is arranged as a four-terminal network and, based on this four-terminal network configuration, it is possible to establish the control patterns (simplification) and to achieve a reduction in spare circuits (facilities), such as shown in FIGS. 2 through 4.

FIG. 2 is a drawing which shows the configuration of a network between a plurality of stations used with the network control apparatus according to a basic embodiment of the present invention, FIG. 3 is a drawing which shows the configuration of a service circuit network within the network used with the network control apparatus according to a basic embodiment of the present invention, and FIG. 4 is a drawing which shows the configuration of spare circuit network within the network used with the network control apparatus according to a basic embodiment of the present invention.

In addition, it is desirable that, in the example of the configuration of station A through station D, shown in FIG. 2, with the prerequisite that physical or logical separation is possible, arbitrary connection within the four-terminal network be usable to configure a number of transmission lines.

In addition, it is desirable in a network formed from a four-terminal network, that the service circuit network 11 shown in FIG. 3 and the spare circuit network shown in FIG. 4 be configured either physically or logically.

Describing this in further detail, the service circuit network 11 operates when the circuits (a) through (f) within the four-terminal network 10 are normal, and the spare circuit network 12, which has spare circuits (a)' through (f)', operates when a fault is detected in part of the above-noted circuits (a) through (f). When the occurrence of such a failure is detected, the above-noted transmission unit control means 5 performs switching from the service circuit network 11 to the spare circuit network 12.

Thereafter, should the faulty section which includes a circuit in which a failure had occurred is restored, the transmission unit control means 5 performs re-switching from the currently used spare circuit network 12 to the original service circuit network 11.

The stations A through D which are shown in FIG. 1 additionally have a function which can detect a faulty section which is caused by a failure (abnormality) of a circuit or piece of equipment which can be separated individually by opposing stations (faulty section detecting means 2); a function which selects an alternative pattern which corresponds to an alternative route (pattern selecting means 4); a function which controls the alternative route which uses the alternative pattern (transmission unit control means 5); a function to control the opposing station; and a function which controls restoration to the service circuit network (transmission unit control means 5).

The above-noted alternative pattern selection, alternative route control, opposing station control, and restoration control each begin operation when triggered by either the detection of an abnormality or the elimination of the abnormality and restoration of the faulting circuit.

The case will now be described in which an abnormality occurs, for example, of either station A or station B, thereby making necessary an alternative route.

To make an alternative route between station A and station B, it is possible to use <1> the alternative route formed via circuit (b), station D, and then circuit (d), <2> the alternative route formed via circuit (c), station C, and then circuit (e), and <3> the alternative route formed via circuit (b), station D, circuit (f), station C, and then circuit (e).

In the case in which uniform alternative routing is done using the above-noted alternative routes <1>, <2>, and <3>, the number of circuits required between stations A and D and between stations B and C is ⅔ (two thirds) of the number of circuits between stations A and B. From the standpoint of efficiency when performing communication of information, the control system for the purpose of distributing the circuits appropriately tends to become complex.

To eliminate this problem, if the above-noted route <3> is eliminated from the alternative routes, leaving only routes <1> and <2>, an alternative route between each station is achieved with a number of circuits that is ½ of the number of circuits between station A and station B.

Therefore, the circuit network of the alternative route in the network control apparatus of the present invention can accommodate the case in which a single fault in the circuits (a) through (f) makes it necessary to use an alternative route with ½ the capacity of each circuit. Additionally, the spare circuit network formed by the spare circuits (a)' to (b)' between stations (refer to FIG. 4) can be used as a spare for 5 of the 6 circuits.

At each of the stations A through D, by having alternative patterns for the 3 circuits connected from the local station and the 3 circuits of the other station, it is possible to handle a abnormality in a circuit or a piece of equipment. Additionally, even with respect to an abnormality in any of the circuits (a) through (f), at each of the stations (A) through (D), because selection of 1 pattern from among 6 and control are performed, it is possible to simplify the control of a network having a four-terminal configuration, which is formed by stations (A) through (D).

In a basic embodiment of the present invention such as described above, because the configuration of the network, which has become complex, is arranged to be a four-terminal network configuration, thus facilitating the establishment of patterns for alternative routes based on this four-terminal configuration and the reduction of the number of spare circuits, in the case in which a failure or the like occurs in the network, it is possible to reduce the amount of time for control of a fault which is caused by the failure or the like.

In addition, because alternative route control is simplified by pre-establishing patterns for alternative routes, it is possible to improve information communication service by minimizing the section affected by the fault. Additionally, by minimizing the number of spare circuits as much as possible, it is possible, by minimizing the spare units and spare equipment, to achieve a reduction in cost.

Figure 5:
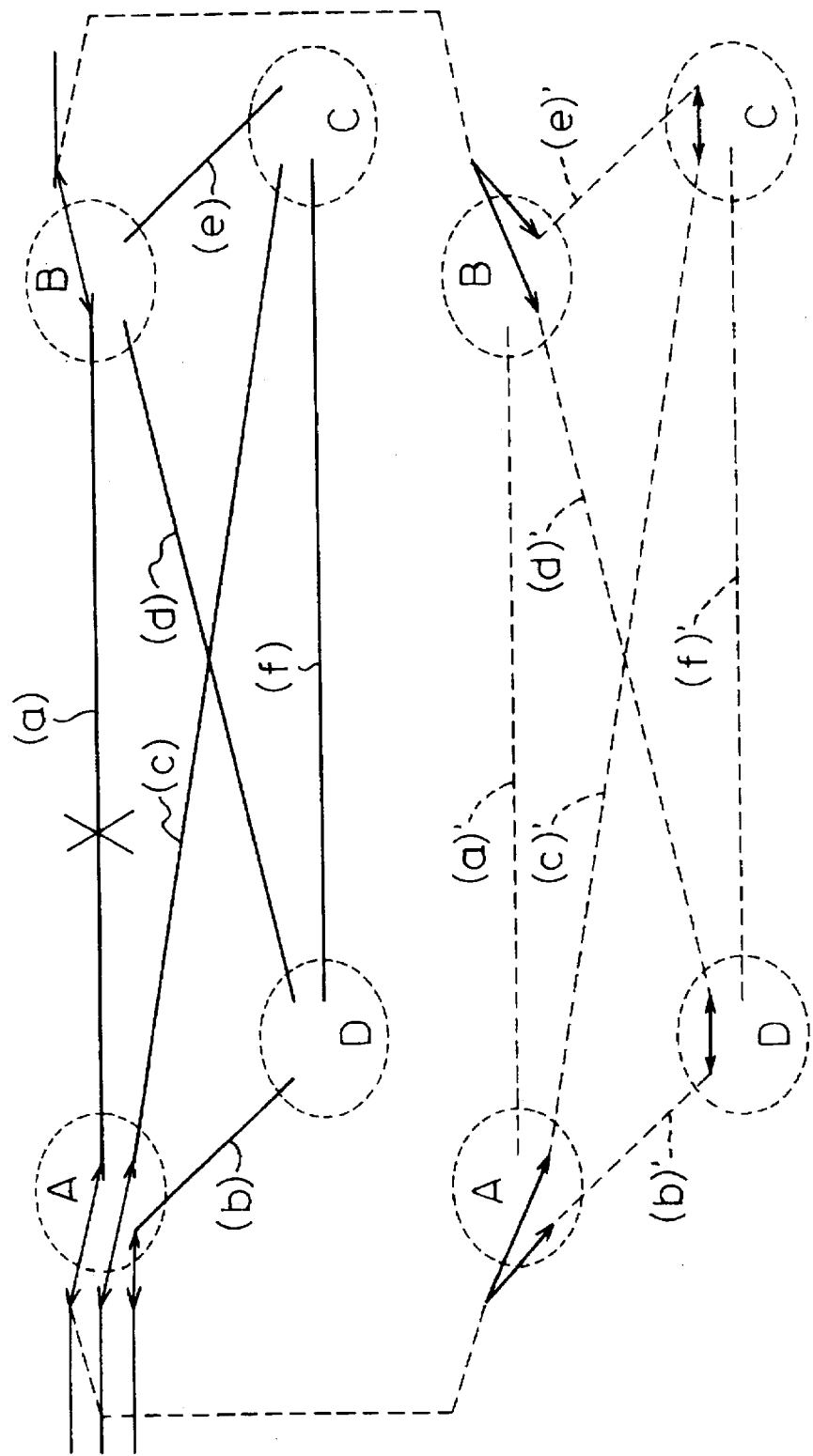
FIG. 5 is a drawing which shows an example of a configuration showing the location of a circuit abnormality and an alternative route pattern with regard to one station.

FIG. 5 is a drawing which shows an example of a configuration showing the location of a circuit abnormality and an alternative route pattern with regard to one station. In the case in which a network control apparatus according to the present invention performs alternative route control, a pattern corresponding to the failure location is selected from the six alternative route patterns (patterns when an abnormality occurs) and control is performed. Hereinafter, any component mentioned before will be referred to using the same reference numeral.

Additionally, the pattern at normal time is fixed as the control pattern which operates when there is no circuit abnormality, and when a section which includes a circuit in which a failure had occurred is restored, circuit switching control is performed from the currently used alternative route pattern to the pattern during normal operation.

Figure 6:
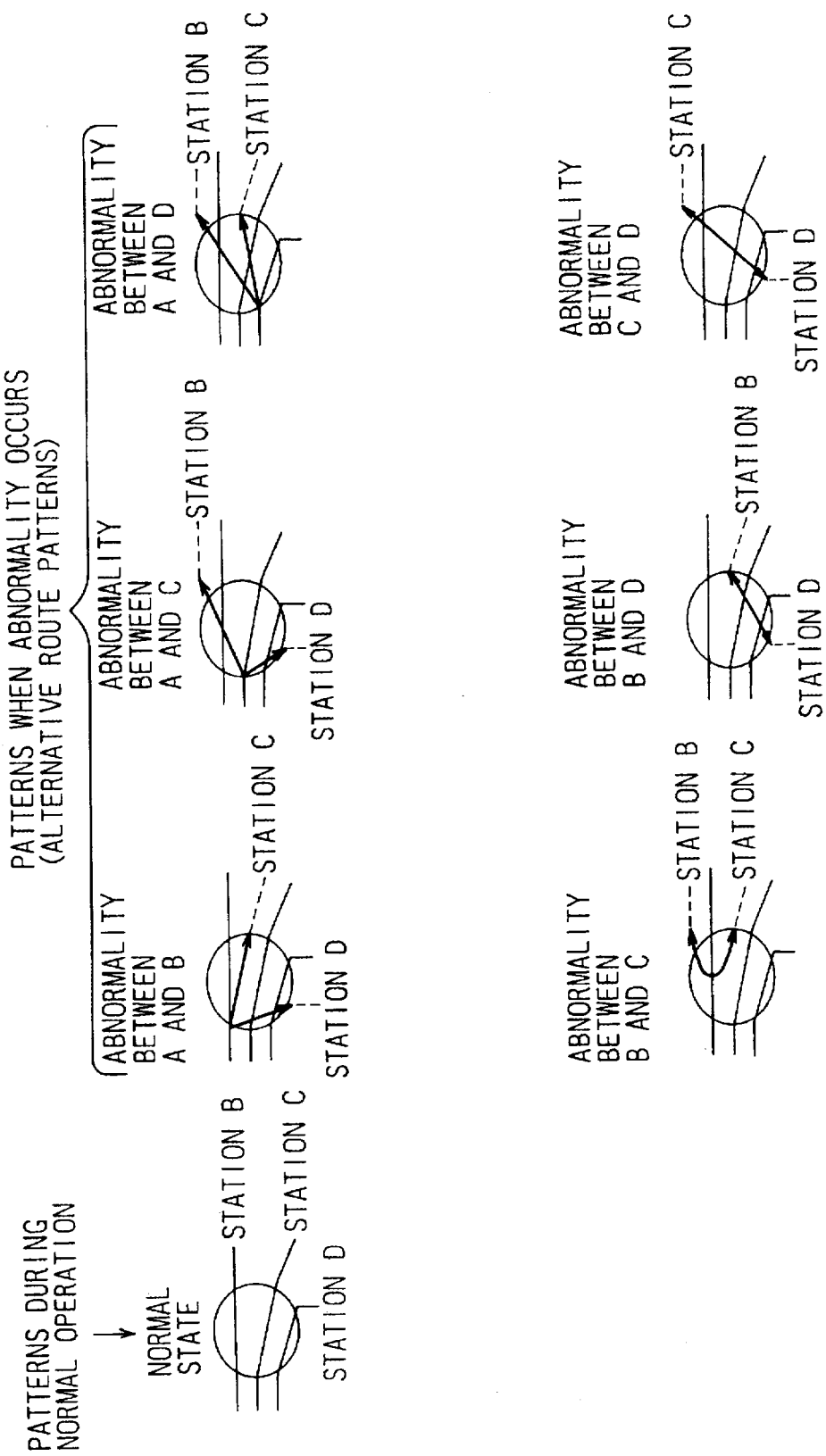
FIG. 6 is a drawing which shows an examples of the pattern for the normal condition and the pattern for the abnormal condition of one station.

FIG. 6 is a drawing which shows an examples of the pattern for the normal condition and the pattern for the abnormal condition of one station.

In FIG. 6, the alternative route patterns for the case in which an abnormality occurs between station A and station B, the case in which an abnormality occurs between station A and station C, the case in which an abnormality occurs between station A and station D, the case in which an abnormality occurs between station B and station C, the case in which an abnormality occurs between station B and station D, and the case in which an abnormality occurs between station C and station D are shown with solid lines. These alternative route patterns are configured using spare circuits (refer, for example, to FIG. 5). In this case, as described previously, the number of spare circuits used is held to the minimum necessary, to achieve a reduction in the number of spare circuits.

In addition, as is clear from the relationship between the alternative route patterns and the patterns during normal operation shown in FIG. 6, it is possible to configure alternative route patterns between each station using, on average, one-half the number of circuits (or fewer) as between station A and station B.

Figure 7:
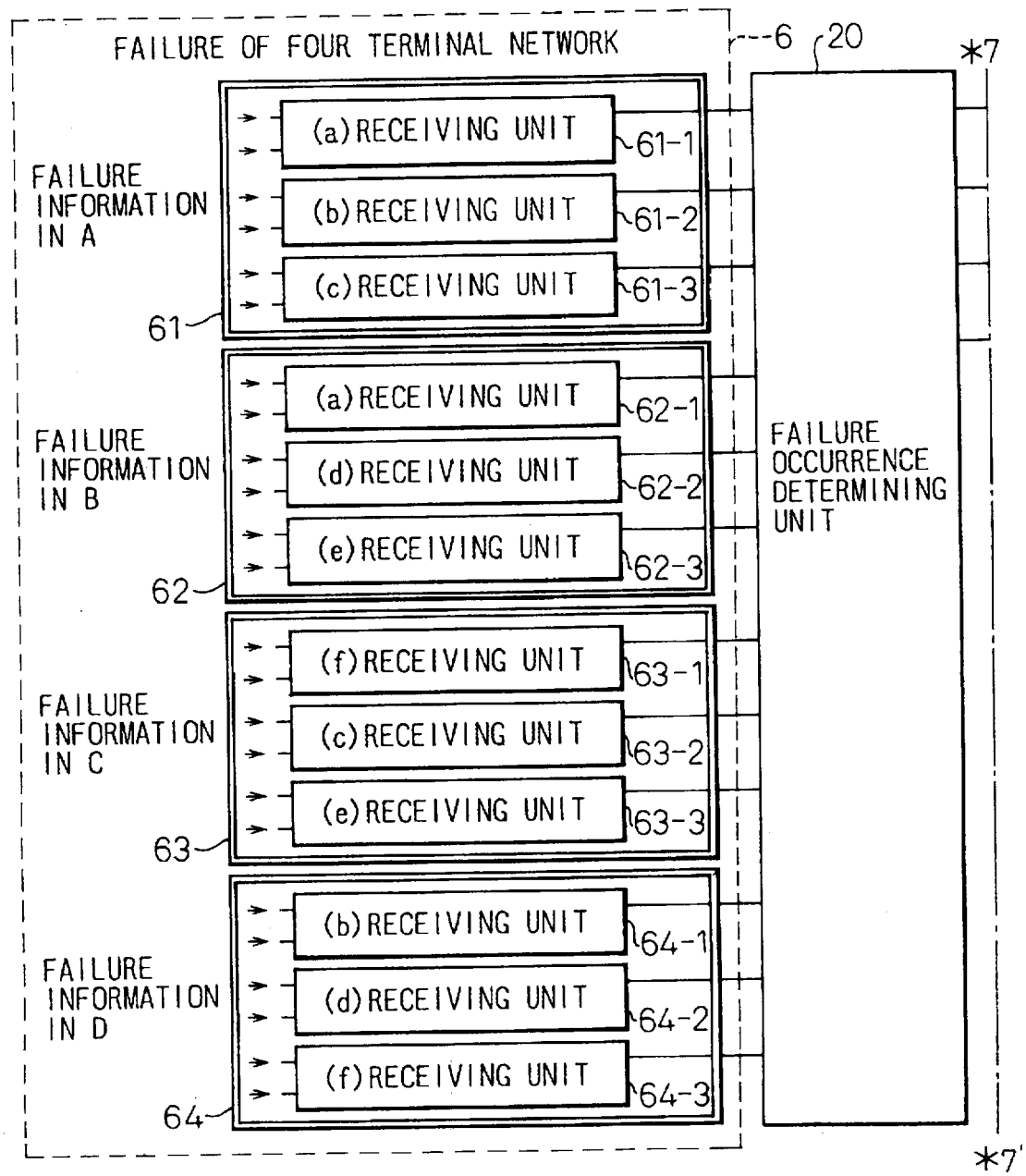
FIG. 7 is a block diagram which shows part 1 of the configuration of the first preferred embodiment of the present invention.
Figure 8:
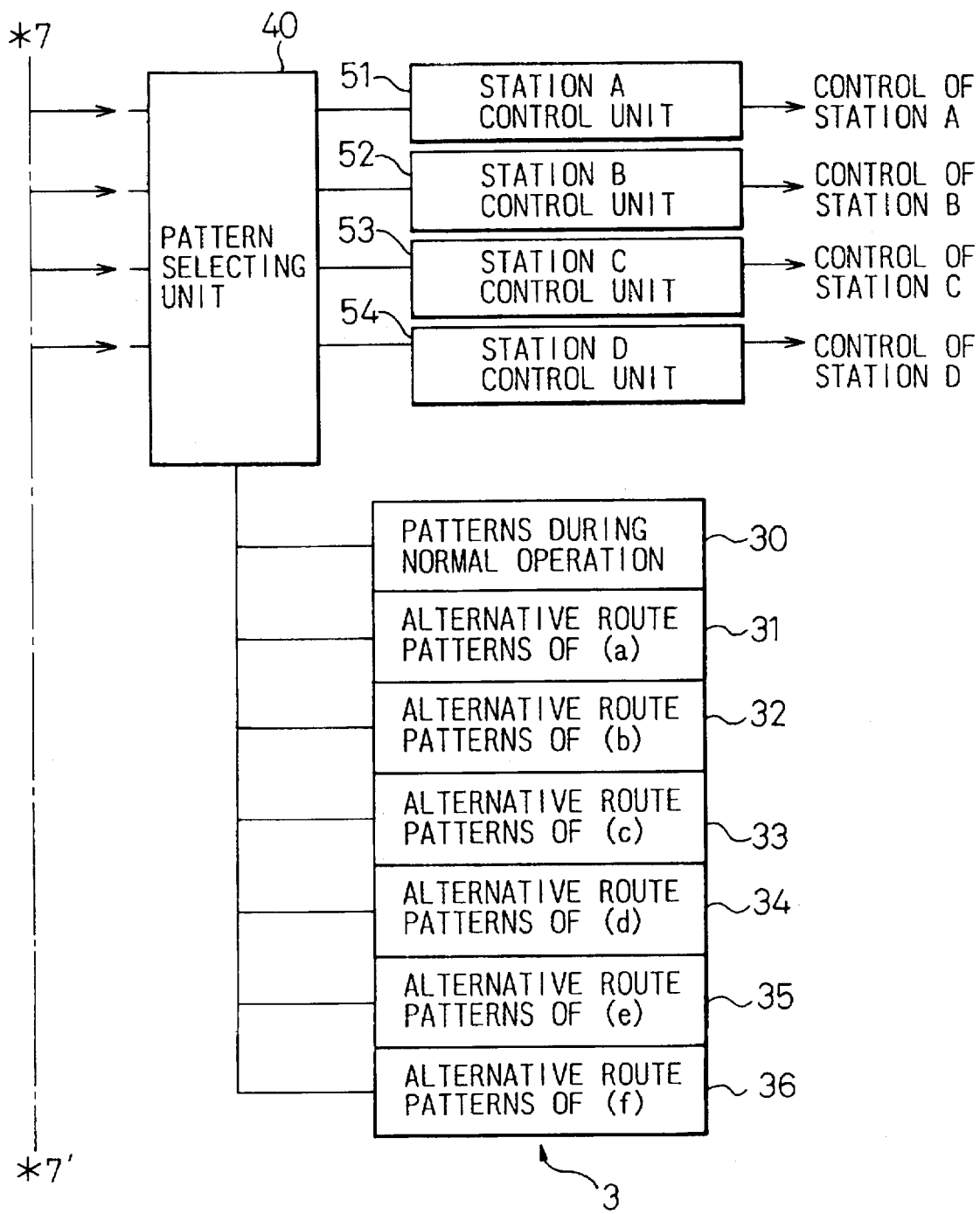
FIG. 8 is a block diagram which shows part 2 of the configuration of the first preferred embodiment of the present invention.

FIG. 7 and FIG. 8 are block diagrams which show parts 1 and 2 of the configuration of the first preferred embodiment of the present invention.

These drawings show an embodiment of a network control apparatus for the purpose of arranging a network configured from a plurality of multiplexed hierarchy layers either physically or logically as a plurality of four-terminal networks, and performing independent alternative route control, with respect to each four-terminal network, of the other four-terminal networks.

In FIG. 7, a failure information receiving unit 6, which receives failure information with regard to a failure which occurs in a circuit between each station (stations A to D; refer to FIG. 2) within each four-terminal network is provided for each four-terminal network. This failure information receiving unit 6 demodulates a digital signal for information communication which is transmitted on each circuit and outputs a signal which includes such failure detection codes as a parity bit and an ECC (error correcting code).

In further detail, the failure information receiving unit 6 has a per-circuit receiving unit 61 for the purpose of receiving failure information with regard to a failure in circuits related to station A (circuits (a), (b), and (c)); a per-circuit receiving unit 62 for the purpose of receiving failure information with regard to a failure in circuits related to station B (circuits (a), (d), and (e)); a per-circuit receiving unit 63 for the purpose of receiving failure information with regard to a failure in circuits related to station C (circuits (f), (c), and (e)); and a per-circuit receiving units 64 for the purpose of receiving failure information with regard to a failure in circuits related to station D (circuits (b), (d), and (f)).

In addition, the station A per-circuit failure information receiving unit 61 has a circuit (a) receiving unit 61-1, a circuit (b) receiving unit 61-2, and a circuit (c) receiving unit 61-3 for receiving failure information with regard to failures occurring respectively in the section of circuit (a), circuit (b), and circuit (c). The station B per-circuit failure information receiving unit 62 has a circuit (a) receiving unit 62-1, a circuit (d) receiving unit 62-2, and a circuit (e) receiving unit 62-3 for receiving failure information with regard to failures occurring respectively in the section of circuit (a), circuit (d), and circuit (e). The station C per-circuit failure information receiving unit 63 has a circuit (f) receiving unit 63-1, a circuit (c) receiving unit 63-2, and a circuit (e) receiving unit 63-3 for receiving failure information with regard to failures occurring respectively in the section of circuit (f), circuit (c), and circuit (e). The station D per-circuit failure information receiving unit 64 has a circuit (b) receiving unit 64-1, a circuit (d) receiving unit 64-2, and a circuit (f) receiving unit 64-3 for receiving failure information with regard to failures occurring respectively in the section of circuit (b), circuit (d), and circuit (f).

In addition, in FIG. 7, a failure occurrence determining unit 20 is provided as the previously described faulty section detecting means 2. This failure occurrence determining unit 20 detects a faulty section which includes a circuit in which a failure has occurred, based on parity bits, ECCs (error correcting codes), or the like from the above-noted per-circuit failure information receiving units 61 through 64. The above-noted failure occurrence determining unit 20 is desirably configured by a logic circuit which includes a comparator or the like for the purpose of determining whether or not a failure has occurred in each circuit by comparison of signals input from each per-circuit failure information receiving unit with a reference signal, and more desirably is configured by a CPU (central processing unit) of a computer system.

In FIG. 8, the above-described pattern storage unit 3 (FIG. 1) is formed by a memory device such as a RAM (read/write memory or random access memory) or a ROM (read only memory). This pattern storage unit 3 can be formed by a RAM or ROM or the like within a CPU.

The above-noted pattern storage unit 3 has stored into it the patterns during normal operation 30, and the six types of alternative route patterns 31, 32, 33, 34, 35, and 36, which are used, respectively, when a failure occurs in circuit sections of circuit (a), circuit (b), circuit (c), circuit (d), circuit (e), and circuit (f).

In addition, in FIG. 8, there is provided a pattern selecting unit 40 as the above-described pattern selecting means 4 (FIG. 1). When a failure occurs in a given circuit, this pattern selecting unit 40 selects one alternative route patterns from a number of alternative route patterns for the failed circuit. The above-noted pattern selecting unit 40 is desirably formed by a switching circuit for the purpose of switching from the pattern during normal operation to a desired alternative route pattern, in accordance with a signal corresponding to the determination results of the failure occurrence determining unit 20, and more desirably is formed by a CPU of a computer system. In this case, by pre-establishing the alternative route patterns, because the alternative route patterns are stored in memory in simplified form, it is possible to select an alternative route pattern in a short period of time. Furthermore, with respect to a circuit in which a failure has not occurred, the patterns during normal operation 30 are used as is, without the pattern selecting unit 40 performing switching and selection operations.

In addition, in FIG. 8, there are provided, as the above-described transmission unit control means 5, a station A control unit 51, a station B control unit 52, a station C control unit 53, and a station D control unit 54, for the purpose of controlling the operation of stations A through D within the four-terminal network based on the pattern during normal operation or alternative route pattern selected by the pattern selecting unit 40.

These control units 51 through 54 are desirably implemented by the CPU of a computer system.

In this case, the patterns during normal operation are fixed as the control patterns which operate when there is no circuit abnormality, and when a faulty section which included a circuit in which a failure occurred is restored, the pattern selecting unit 40 and the control units 51 through 54 perform switching and control with respect to this circuit so as to return from the currently used alternative route pattern to the normal service pattern.

In the above-noted first embodiment, at each of the stations A through D, three circuits connected from the local station and alternative route patterns for three circuits from the other stations are pre-stored in the pattern storage unit 3, and by causing the control units 51 through 54 to operate with the desired alternative route pattern selected from this pattern storage unit 3, it is possible to quickly accommodate the occurrence of a failure in a circuit or in transmission equipment. In addition, even if an abnormality occurs in any of the circuits (a) through (f), by selecting one pattern of six and performing control at each of the stations A through D, the alternative route control of the four-terminal network which is made up of the stations A through D is simplified and the time required to perform this alternative route control is shortened, thereby enabling a minimization of the affect of the instantaneous cutoff of the communication network caused by this alternative route control.

FIG. 9 (A) and FIG. 9 (B) are drawings which show the matrix of fault information judgment and alternative route pattern selection used, for example, in the above-described first embodiment of the present invention. This matrix is an illustration of the contents of the memory of the pattern storage unit 3 which is shown in FIG. 8. The stars (☆) in FIG. 9 indicate circuits in which the occurrence of a failure has been detected as the judgment results of the failure occurrence determining unit 20. In the horizontal direction of the above-noted matrix, if there is star in only one circuit of one station (for example, in circuit (a) of station A or circuit (a) of station B), this means that a failure at a single station has occurred, and if there are two or more stars at the same circuit for two stations (opposing stations) (for example, circuit (a) of station A and station B), this means that a failure between opposite stations has occurred.

FIG. 9 (A) shows, along the vertical direction of the above-noted matrix, the normal pattern and the faulty section between circuit (a) and circuit (c), whereas FIG. 9 (B) shows the faulty section between circuit (d) and circuit (f).

With both the failure at a signal station and the failure between opposite stations which are shown in FIG. 9 (A) and FIG. 9 (B), by selecting an alternative route pattern so that the faulty section (marked by a star) which includes a circuit in which a failure has occurred is avoided by using a spare circuit corresponding to that alternative route pattern, it is possible to avoid the instantaneous cutoff of communication caused by the above-noted faulty section. In this case, because the number of spare circuits used is reduced to minimum required number, so that the number of spare circuits is reduced, it is possible to implement the spare circuit network with one-half the capacity of the maximum circuits of the plurality of circuits.

Figure 10:
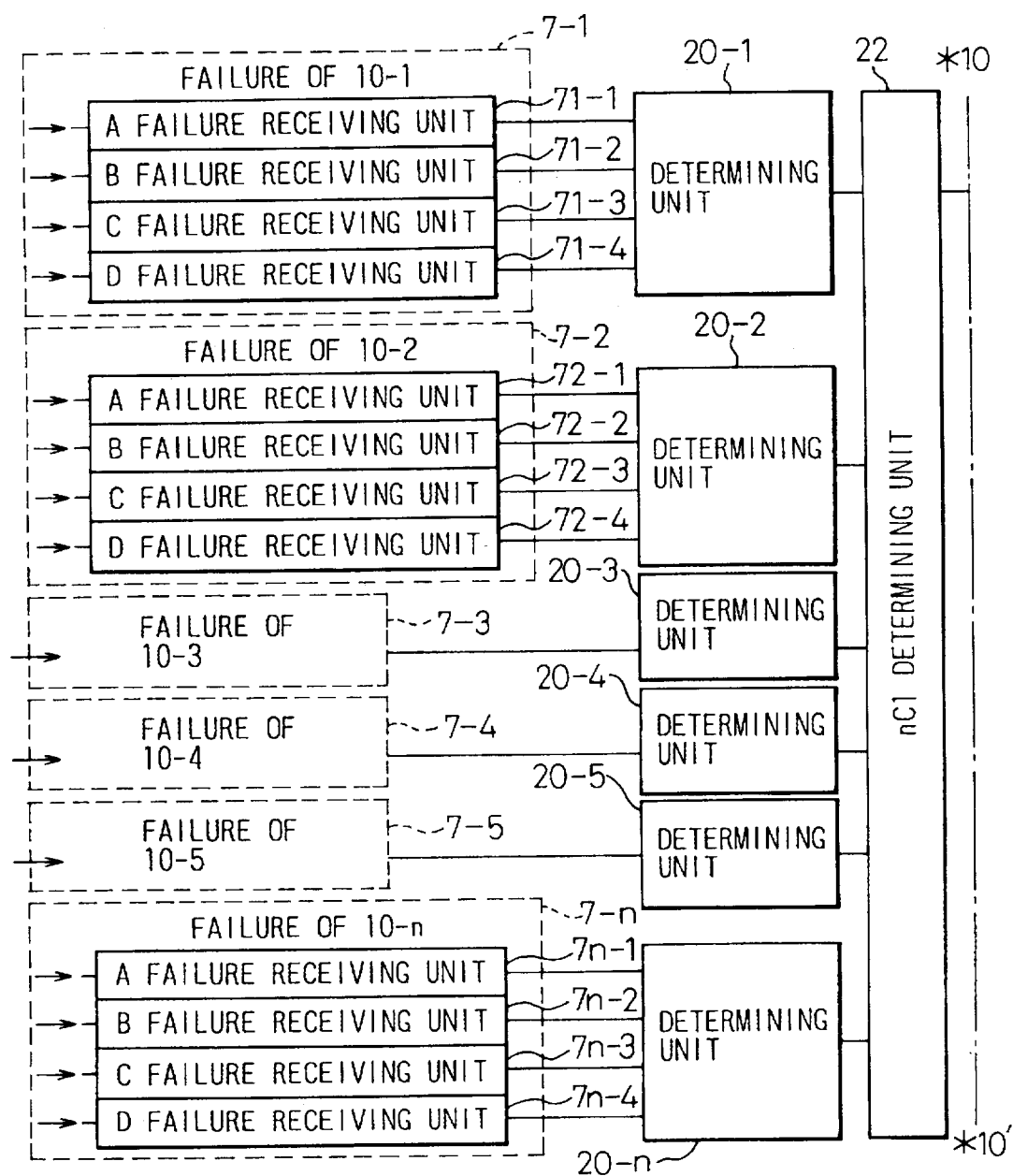
FIG. 10 is block diagram which shows part 1 of the configuration of the second preferred embodiment of the present invention.
Figure 11:
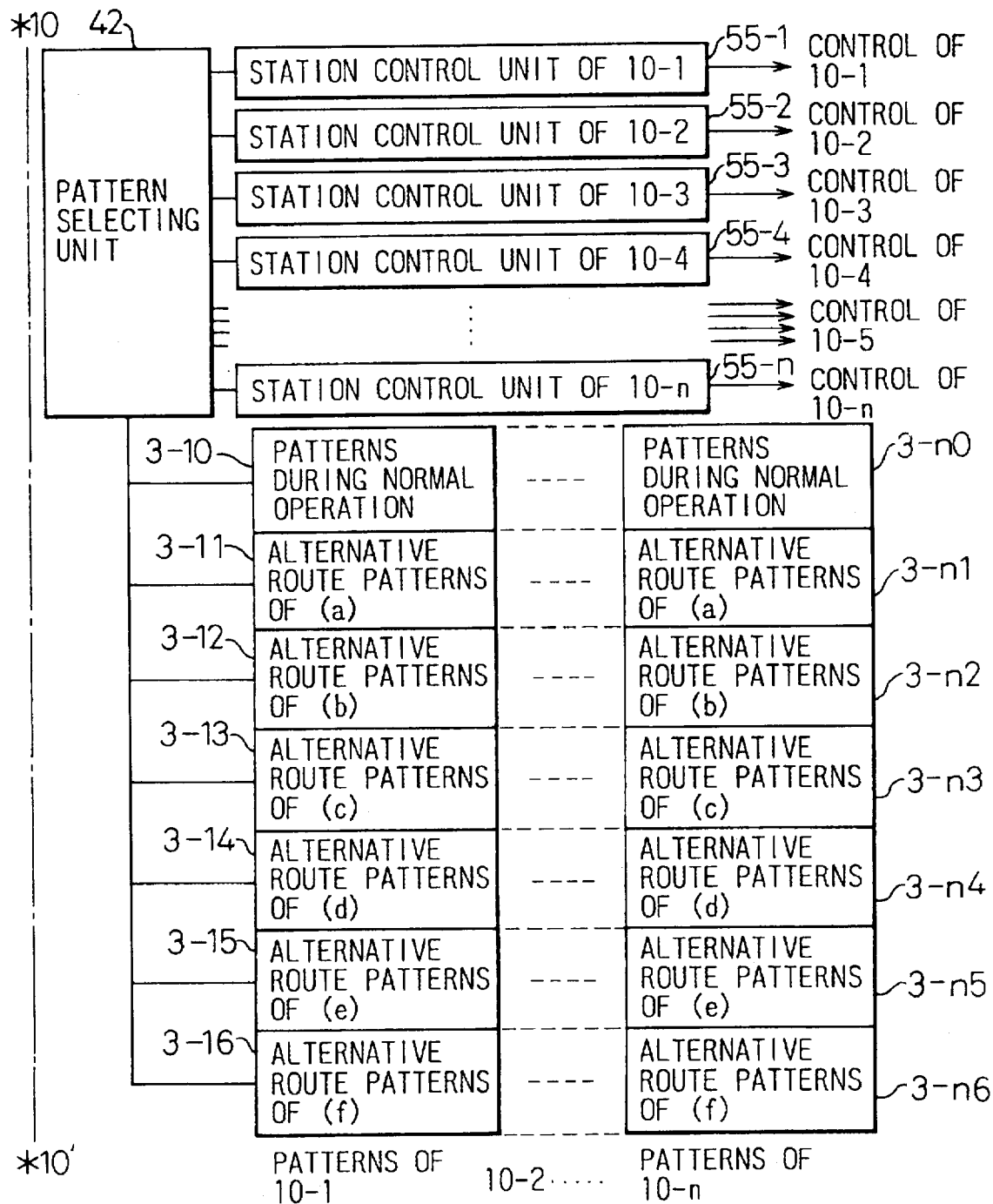
FIG. 11 is block diagram which shows part 2 of the configuration of the second preferred embodiment of the present invention.

FIG. 10 and FIG. 11 are block diagrams which show parts 1 and 2 of the configuration of the second preferred embodiment of the present invention.

These drawings show the example of implementing a plurality of four-terminal networks (for example n (where n is a positive integer) four-terminal networks 10-1, 10-2, 10-3, 10-4, 10-5, . . . 10-n), which make up the communication network, using one spare circuit network.

In FIG. 10, to perform separate control of this plurality of four-terminal networks 10-1, 10-2, 10-3, 10-4, 10-5 . . . 10-n, failure information receiving units 7-1, 7-2, 7-3, 7-4, 7-5 . . . 7-n are provided for each of the four-terminal networks, respectively. Each of these failure information receiving units 7-1, 7-2, 7-3, 7-4, 7-5 ..... 7-n corresponds to the failure information receiving unit 6 of the first embodiment, which is shown in FIG. 7, these having a function which demodulates a digital signal for information communication which is transmitted on each circuit and outputs a signal which includes such failure detection codes as a parity bit and an ECC (error correcting code).

Describing this in more detail, the failure information receiving unit 7-1 of the first four-terminal network 10-1 includes failure receiving units 71-1, 71-2, 71-3, and 71-4, for stations A through D, respectively. Next, the failure information receiving unit 7-2 of the second four-terminal network 10-2 includes failure receiving units 72-1, 72-2, 72-3, and 72-4, for stations A through D. The failure information receiving units 7-3 through 7-5 of the third to fifth four-terminal network 10-3 through 10-5 include the same arrangement of failure receiving unit. Thereafter, this is repeated, until finally the failure information receiving unit 7-n of the n-th four-terminal network 10-n, which includes failure receiving units 7n-1, 7n-2, 7n-3, and 7n-4.

In addition, in FIG. 10, a plurality of determining units 20-1, 20-2, 20-3, 20-4, 20-5 . . . , 20-n are provided in correspondence to the plurality of four-terminal networks 10-1 through 10-n. Each of these determining units 20-1, 20-2, 20-3, 20-4, 20-5 . . . 20-n corresponds to the failure occurrence determining unit 20 of the above-described first embodiment, which is shown in FIG. 7. Each of the determining units 20-1 through 20-n detects a faulty section which includes a circuit in which a failure has occurred, based on signals which include parity bits or an ECC or the like from each of the above-noted failure information receiving units 7-1 through 7-n. Each of the above-noted determining units is desirably formed by a logic circuit which includes a comparator for the purpose of judging whether or not a failure has occurred in each of the circuits, and more desirably is formed by a CPU of a computer system.

In addition, in FIG. 10, an nC1 determining unit 22 is provided for the purpose of determining that a failure has occurred in one four-terminal network of a plurality (n) of four-terminal networks 10-1 through 10-n. The provision of this nC1 determining unit 22 can be stated as a major difference with respect to the above-described first embodiment.

In FIG. 11, the above-described pattern storage unit 3, in the same manner as in the first embodiment, is configured by RAM or ROM memory.

In this case, however, there is a difference with respect to the first embodiment, in that for each of the four-terminal networks (10-1 through 10-n) the pattern during normal operation and the alternative route patterns for circuit (a), circuit (b), circuit (c), circuit (d), circuit (e), and circuit (f) are stored as a plurality of pattern types which correspond to the plurality of four-terminal networks. Describing this in further detail, the above-noted pattern storage unit 3 has stored in it the normal service patterns (i.e., patterns during normal operation 3-10 to 3-n0) which are used when there is no failure in a circuit, the plurality of alternative route patterns 3-11 to 3-n1, 3-12 to 3-n2, 3-13 to 3-n3, 3-14 to 3-n4, 3-15 to 3-n5, and 3-16 to 3-n6 for circuits (a) through (f) which are related to the alternative routes which are used when there occurs a failure in the section circuit (a), circuit (b), circuit (c), circuit (d), circuit (e), and circuit (f), these being pre-stored as patterns, in correspondence with the plurality of four-terminal networks 10-1 through 10-n.

In addition, in FIG. 11, a pattern selecting unit 42 is provided as the above-described pattern selecting means 4.

This pattern selecting unit 42 corresponds to the above-described pattern selecting unit 40 of FIG. 8. When a failure occurs in a circuit which is included in one of the four-terminal networks of the n four-terminal networks 10-1 through 10-n, the above-noted pattern selecting unit 42 selects one alternative route pattern from among a number of alternative route patterns which correspond to the circuit in which this failure has occurred. Desirably, the above-noted pattern selecting unit 42 is configured by a switching circuit for the purpose of switching from the pattern during normal operation to a desired alternative route pattern, in accordance with a signal corresponding to the determination results of the nC1 determining unit 22, and more desirably is formed by a CPU of a computer system. In this case as well, in the same manner as in the above-described first embodiment, because the alternative route patterns are stored in memory in simplified form, it is possible to select an alternative route pattern in a short period of time.

In addition, in FIG. 11, a plurality of control units are provided for the purpose of controlling the operation of stations A through D, based on the normal pattern or alternative route pattern selected by the pattern selecting unit 42. Stated in further detail, the plurality of control units comprise the station control unit 55-1 for the four-terminal network 10-1, the station control unit 55-2 for the four-terminal network 10-2, the station control unit 55-3 for the four-terminal network 10-3, the station control unit 55-4 for the four-terminal network 10-4 and so on, up to the station control unit 55-n for the four-terminal network 10-n, these respectively controlling the operation of the stations A through D of first four-terminal network 10-1, the second four-terminal network 10-2, the third four-terminal network 10-3, the fourth four-terminal network 10-4 and so on, up to the n-th four-terminal network 10-n. Each of these station control units 55-1 through 55-n corresponds to the above-described control units 51 through 54 which are shown in FIG. 8. Additionally, the above-noted station control units 55-1 through 55-n are desirably implemented by a CPU of a computer system.

In this case, the pattern at normal time is fixed as the control pattern which operates when there is no circuit abnormality, and when a section which includes a circuit in which a failure had occurred is restored, switching control is performed by the pattern selecting unit 42 and the station control units 55-1 through 55-n so that switching is made to return from the currently used alternative route pattern to the pattern during normal operation.

In the above-noted second embodiment, at each of the four-terminal networks, the 3 circuits connected from the local station and alternative route patterns for three circuits from the other stations are pre-stored into the pattern storage unit 3, and by causing the station control units 55-1 through 55-n to operate with the desired alternative route pattern selected from this pattern storage unit 3, it is possible to quickly accommodate the occurrence of a failure in a circuit of a plurality of four-terminal networks or in transmission equipment. In addition, by sharing a spare circuit network in the plurality of four-terminal networks, it is possible to reduce the spare circuit network in comparison with the case of the first embodiment, thereby enabling economical restoration of the communication network.

Figure 12:
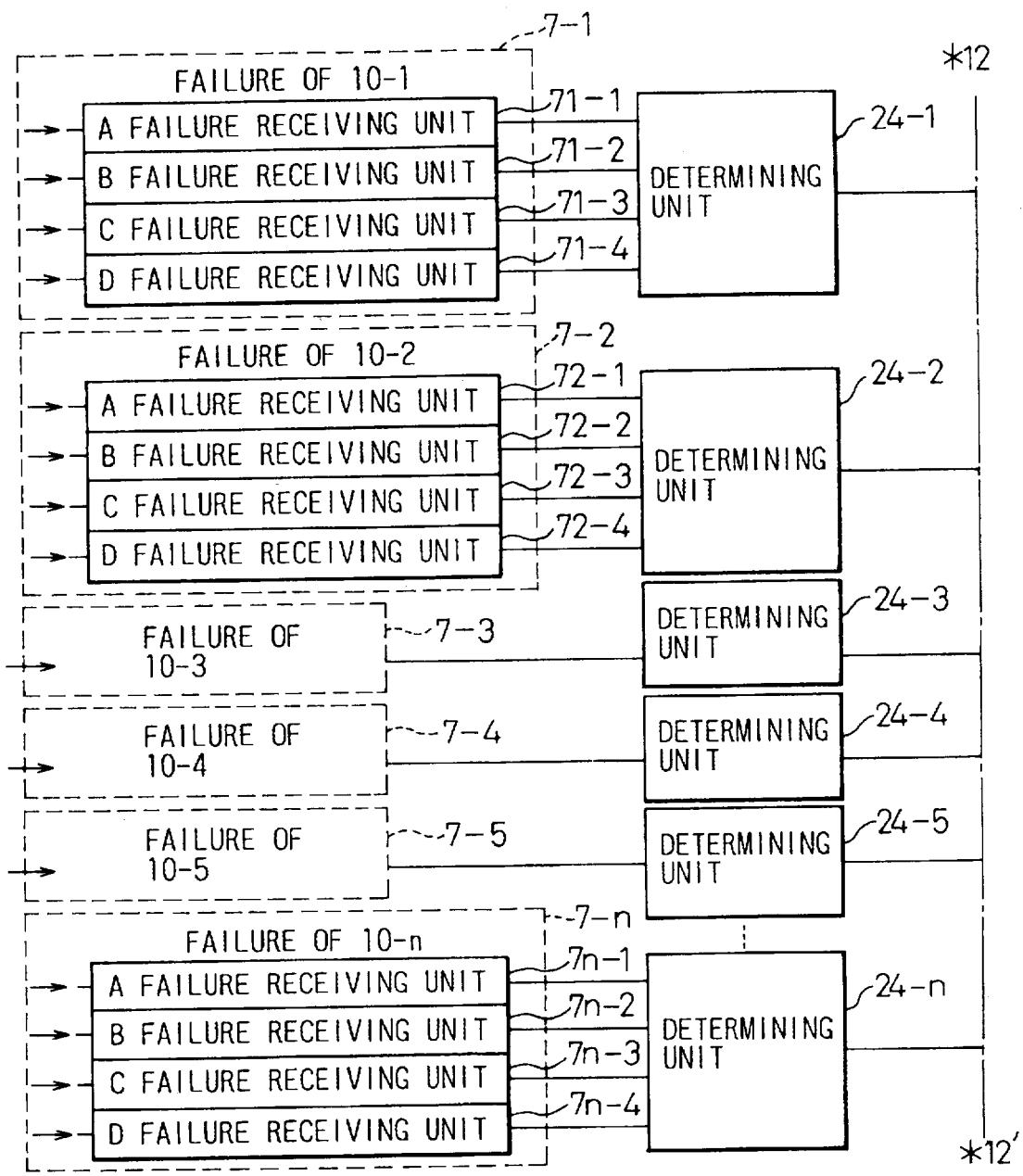
FIG. 12 is block diagram which shows part 1 of the configuration of the third preferred embodiment of the present invention.
Figure 13:
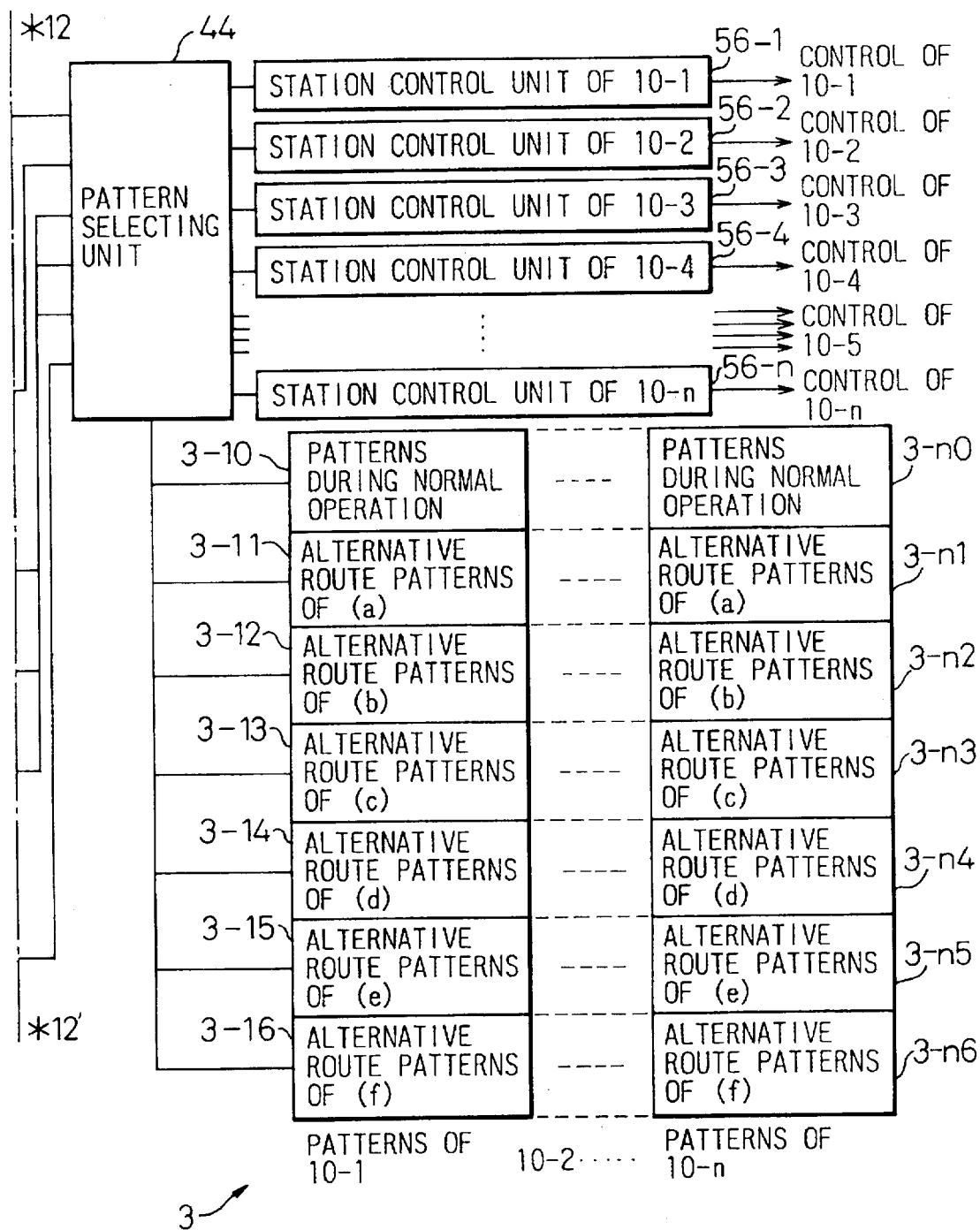
FIG. 13 is block diagram which shows part 2 of the configuration of the third preferred embodiment of the present invention.

FIG. 12 and FIG. 13 show, respectively, part 1 and part 2 of the configuration of the third embodiment of the present invention.

In the third embodiment shown in FIG. 12 and FIG. 13, in the case in which the degree of multiplexing of the structure of a particular section within the communication network is high, relative to other sections, a control unit is applied so that this type of specific section is divided and multiple alternate routes are taken. This third embodiment is basically an aggregation of a plurality of the first embodiment described above.

In FIG. 12, each of the four-terminal networks is provided with failure information receiving units 7-1, 7-2, 7-3, 7-4, 7-5, and so on, up to 7-n, these each having the same configuration as in the second embodiment shown in FIG. 10. Each of these failure information receiving units 7-1, 72, 7-3, 7-4, 7-5, and so on, up to 7-n demodulates a digital signal for information communication which is transmitted on each circuit and outputs a signal which includes such failure detection codes as a parity bit and an ECC (error correcting code. The above-noted failure information receiving units 7-1 through 7-n were described in detail with regard to the second embodiment, and will therefore not be further described.

In addition, in FIG. 12, a plurality of determining units 24-1, 24-2, 24-3, 24-4, 24-5 . . . 24-n are provided in correspondence to the plurality of four-terminal networks 10-1 through 10-n. Each of these determining units 24-1, 24-2, 24-3, 24-4, 24-5 . . . 24-n corresponds to the above-described determining units 20-1 through 20-n of FIG. 10. Each of the determining units 24-1 through 24-n detects a faulty section which includes a circuit in which a failure has occurred, based on signals which include parity bits or an ECC or the like from each of the above-noted failure information receiving units 7-1 through 7-n. Each of the above-noted determining units is desirably formed by a logic circuit which includes a comparator for the purpose of judging whether or not a failure has occurred in each of the circuits, and more desirably is formed by a CPU of a computer system.

In this case, even if a judgment is made that a failure has occurred in a plurality of four-terminal networks within the n four-terminal networks 10-1 through 10-n, the results of these judgments are input together to the pattern selecting unit 44, which is shown in FIG. 13. That is, in this case, in contrast to the case of the second embodiment, the nC1 determining unit is provided at the determining units 24-1 through 24-n.

In FIG. 13, normal service patterns and alternative route patterns for circuit (a), circuit (b), circuit (c), circuit (d), circuit (e), and circuit (f), are pre-stored as a plurality of pattern types for a plurality of four-terminal networks, with the same configuration as the above-noted pattern storage unit 3. A pattern storage unit configuration in the above-noted manner was described above with regard to the second embodiment, and will therefore not be further described.

In addition, in FIG. 13, a pattern selecting unit 44 is provided as the above-described pattern selecting means 4. This pattern selecting unit 44 is similar to, but differs with respect to, the pattern selecting unit 42 of FIG. 13 in the following manner. Specifically, when a failure occurs in a circuit within one or more than one four-terminal network of the n four-terminal networks 10-1 through 10-n, the pattern selecting unit 44 of FIG. 13 selects one alternative route pattern from among the several alternative route patterns corresponding to each of the circuits having these failures. Desirably, the above-noted pattern selecting unit 44 is formed by a switching circuit for the purpose of switching from the pattern during normal operation to a desired alternative route pattern, in accordance with signals corresponding to the determination results of the plurality of determining units 24-1 through 24-n, and more desirably is formed by a CPU of a computer system. In this case as well, in the same manner as in the above-described first embodiment and second embodiment, because the alternative route patterns are stored in memory in simplified form, it is possible to select an alternative route pattern in a short period of time.

In addition, in FIG. 13, a plurality of control units are provided for the purpose of controlling the operation of stations A through D, based on the normal pattern or alternative route pattern selected by the pattern selecting unit 44. Stated in further detail, the plurality of control units comprise the station control unit 56-1 for the four-terminal network 10-1, the station control unit 56-2 for the four-terminal network 10-2, the station control unit 56-3 for the four-terminal network 10-3, the station control unit 56-4 for the four-terminal network 10-4 and so on, up to the station control unit 56-n for the four-terminal network 10-n, these respectively controlling the operation of the stations A through D of the first four-terminal network 10-1, the second four-terminal network 10-2, the third four-terminal network 10-3, the fourth four-terminal network 10-4 and so on, up to the n-th four-terminal network 10-n. Each of these station control units 56-1 through 56-n corresponds to the above-described station control units 55-1 through 55-n of the second embodiment, which are shown in FIG. 11. In this case, however, in contrast to the case of the second embodiment, the alternative route patterns corresponding to a faulty circuit within each of the plurality of four-terminal networks are taken from the alternative route pattern selecting unit 44. Additionally, the above-noted station control units 56-1 through 56-n are desirably implemented by a CPU of a computer system.

In this case, the pattern at normal time is fixed as the control pattern which operates when there is no circuit abnormality, and when a section which includes a circuit in which a failure had occurred is restored, switching control is performed by the pattern selecting unit 44 and the station control units 56-1 through 56-n so that switching is made to return from the currently used alternative route pattern to the pattern during normal operation.

In the above-described third embodiment, making use of the fact that four-terminal network configuration is possible either physically or logically, within a range in which the fault in the communication network can be identified as being within a arbitrary section, even in a long-distance network which passes through a plurality of sections, it is possible to implement the above four-terminal network configuration using units with which it is possible to establish a unique correspondence between failures and sections.

In addition, in the above-noted third embodiment, even in the case in which a long-distance network is configured by the combination of a plurality of small sections, making use of the fact that it is possible to configure an alternative route using the four-terminal network configuration of the small sections, it is possible to implement a long-distance network arranged as four-terminal networks, by connecting a plurality of four-terminal networks after configuring the four-terminal networks, using units with which it is possible to establish a unique correspondence between failures and sections.

By virtue of such a four-terminal network configuration, because it is possible to perform pattern selection and alternative route control for each four-terminal network which is obtained by dividing the previously used network control range either one time or more than one time, there is not only a great shortening of the time required for control, but also a significant shortening of the period of time during which the circuit is stopped.

According to the embodiment of the present invention as described above, each individual level of a complex communications network is either physically or logically arranged into a four-terminal network configuration, this facilitating the reduction, based on this four-terminal network configuration, of the number of alternative route patterns and spare circuits, so that when a failure or the like occurs in the network it is possible to reduce the control time with respect to a fault caused by this failure or the like.

In addition, because by establishing patterns of alternative routes beforehand so as to simplify the alternative route control it is possible to perform alternative route control for each individual level of occurrence of an abnormality, it is possible to minimize the section affected by the above-noted fault. Furthermore, by reducing the number of spare circuits as much as possible, it is possible to achieve a minimization of spare units and spare equipment. Specifically, the spare circuit network can be implemented with one-half the capacity of the maximum circuits in the plurality of circuits, and it is further possible, in cases which enable sharing of a spare network, to enabling further economy in restoration of the communication network.

In addition, according to the embodiments of the present invention, it is possible to physically or logically configure a four-terminal network, using units which enable identification of a fault in the network over an arbitrary section, and even in a long-distance network which passes through a plurality of sections, it is possible to configure the network using units with which it is possible to establish a unique correspondence between failures and each section.

By doing this, because it is possible to perform pattern selection and alternative route control for each four-terminal network which is obtained by dividing the previously used network control range either one or more than one time, there is not only a great shortening of the time required for control, but also a significant shortening of the period of time during which the circuit is stopped, this representing an improvement in the information communication service.

I claim:

1. A network control apparatus for the purpose of performing control of a network which is made up of a plurality of transmission units and a plurality of circuits which make connection between said plurality of transmission units, and said network performing communication of information between different points in said network over prescribed circuit paths formed by said plurality of circuits, each of said plurality of transmission units being represented as terminals within said network, said network being arranged by means of said plurality of transmission units and said plurality of circuits into terminal networks of four or more terminals, said network control apparatus comprising:

a faulty circuit path detecting means which detects a faulty circuit path which includes a circuit in which a failure has occurred, based on failure information with regard to failures which may occur in each said terminal network;

a pattern storage unit in which are pre-stored patterns, for each said terminal network, with regard to the transmission lines which could be taken in each of said terminal networks;

a pattern selection means which, when a said faulty circuit path is detected, selects from said pattern storage means a pattern of said patterns corresponding to an alternative route other than said faulty circuit path; and a transmission unit control means which controls the operation of each of said transmission units which are included in a faulty circuit path in accordance with a transmission line which includes said selected pattern.

2. A network control apparatus according to claim 1, wherein each of said terminal networks within said network is formed, separated into a circuit path formed from a physically configured circuit and a circuit path formed from a logically configured circuit.

3. A network control apparatus according to claim 1, wherein each said terminal network within said network comprises a service circuit network portion which operates when said circuit is normal, and a spare circuit network portion which operates when a failure occurs in part of said circuit, and wherein said transmission unit control means executes switching from said service circuit network portion to said spare circuit network portion.

4. A network control apparatus according to claim 3, wherein, in the case in which a faulty section which includes a circuit in which said failure occurred is restored, said transmission unit control means executes re-switching from a currently used spare circuit network portion to a service circuit network portion.

* * * * *